United States Patent
Sandstrom et al.

(10) Patent No.: US 7,678,216 B2
(45) Date of Patent: *Mar. 16, 2010

(54) TIRE FILLED WITH CORE AND CURABLE ELASTOMERIC MATERIAL AND METHOD

(75) Inventors: Paul Harry Sandstrom, Cuyahoga Falls, OH (US); George Frank Balogh, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 339 days.

This patent is subject to a terminal disclaimer.

(21) Appl. No.: 11/224,463

(22) Filed: Sep. 12, 2005

(65) Prior Publication Data

US 2007/0056670 A1    Mar. 15, 2007

(51) Int. Cl.
*B29D 30/00* (2006.01)
*B29D 30/04* (2006.01)

(52) U.S. Cl. .............. 156/110.1; 156/112; 156/113; 152/246

(58) Field of Classification Search .......... 152/155, 152/157, 158, 195, 196, 246, 310, 311, 312, 152/313, 516, 520; 156/110.1, 112, 113
See application file for complete search history.

(56) References Cited

U.S. PATENT DOCUMENTS

| | | | |
|---|---|---|---|
| 1,097,824 A | 5/1914 | Staten | |
| 3,022,810 A | 2/1962 | Lambe | |
| 3,381,735 A | 5/1968 | Talcott et al. | |
| 3,650,865 A * | 3/1972 | Hawkes et al. | 156/119 |
| 3,866,652 A | 2/1975 | Ahmad | |
| 3,872,201 A * | 3/1975 | Paul et al. | 264/55 |
| 3,907,018 A * | 9/1975 | Fujikawa et al. | 152/310 |
| 4,060,578 A | 11/1977 | Kisbany | |
| 4,371,023 A * | 2/1983 | Campagna | 152/158 |
| 4,383,566 A * | 5/1983 | Houghton | 152/158 |
| 5,468,316 A * | 11/1995 | O'Coin | 156/64 |
| 5,681,411 A | 10/1997 | O'Coin | |
| 6,568,443 B2 | 5/2003 | Shoner | |
| 6,623,580 B2 | 9/2003 | McMahon et al. | |
| 6,779,572 B2 | 8/2004 | Tabor et al. | |

FOREIGN PATENT DOCUMENTS

| | | | |
|---|---|---|---|
| CN | 1651271 | * | 10/2005 |
| DE | 1939298 | * | 4/1970 |
| JP | 57058501 | | 4/1982 |
| JP | 10-324110 | * | 12/1998 |

(Continued)

OTHER PUBLICATIONS

Machine translation of JP 10-324110, 1998.*

(Continued)

*Primary Examiner*—Justin Fischer
(74) *Attorney, Agent, or Firm*—Wood, Herron & Evans, LLP

(57) ABSTRACT

A tire having a core located in a tire cavity and a cured and foamed elastomeric material located in the tire cavity adjacent the core. The core is made of a solid material, a precured and foamed elastomeric material or a hollow rigid structure. The core may be a single piece or fabricated from multiple pieces.

4 Claims, 9 Drawing Sheets

FOREIGN PATENT DOCUMENTS

| JP | 2003011626 | * | 1/2003 |
| JP | 2004358805 | * | 12/2004 |

OTHER PUBLICATIONS

Related U.S. Appl. No. 11/159,953 Office Action dated May 16, 2008, 8 pages.
Related U.S. Appl. No. 11/159,953 Office Action dated Oct. 17, 2008, 6 pages.
Related U.S. Appl. No. 11/159,953 Office Action dated Nov. 23, 2007, 9 pages.
Related U.S. Appl. No. 11/224,460 Notice Of Allowance, 6 pages.
Related U.S. Appl. No. 11/224,460 Office Action dated Feb. 13, 2008, 10 pages.
Related U.S. Appl. No. 11/224,460 Office Action dated Oct. 31, 2007, 8 pages.
Related U.S. Appl. No. 11/224,461 Advisory Action 062608, 6 page.
Related U.S. Appl. No. 11/224,461 Advisory Action dated Aug. 13, 2008, 1 page.
Related U.S. Appl. No. 11/224,461 Office Action dated Sep. 19, 2008, 4 pages.
Related U.S. Appl. No. 11/224,461 Office Action dated May 21, 2008, 9 pages.
Related U.S. Appl. No. 11/224,461 Office Action dated Oct. 17, 2007, 9 pages.
Machine translation from the SIPO website, of Chinese Patent CN 1651271 to Wu. This is in the form of "Exhibit A" because it is also an exhibit attached to the response to final office action of the current application. This is 7 pages long, 2005.

* cited by examiner

TIRE FILLED WITH CORE AND CURABLE ELASTOMERIC MATERIAL AND METHOD

CROSS REFERENCES TO RELATED APPLICATIONS

This application is related to U.S. patent application Ser. No. 11/159,953 filed on Jun. 23, 2005 and entitled TIRE CONTAINING CELLULAR RUBBER WITHIN ITS TIRE CAVITY, the entirety of which is hereby incorporated by reference herein.

This application is further related to a U.S. Patent Application filed on even date herewith by Paul H. Sandstrom and entitled TIRE FILLED WITH RECYCLED AND CURABLE ELASTOMERIC MATERIAL AND METHOD, the entirety of which is hereby incorporated by reference herein.

This application is further related to a U.S. patent Application filed on even date herewith by Paul H. Sandstrom et al. and entitled VEHICLE WHEEL MADE WITH PRECURED ELASTOMERIC MATERIAL AND METHOD, the entirety of which is hereby incorporated by reference herein.

FIELD OF THE INVENTION

This invention relates generally to vehicle tires and more particularly, to foam filled tires.

BACKGROUND OF THE INVENTION

Foam filled tires are especially useful in applications involving industrial and off-the-road vehicles, where it is essential to maintain the vehicles in service, since time lost for repairs is very costly. It is known to fill tires with a curable and foamable elastomeric material, which, after heat curing, expands to a closed cell foam rubber composition that provides an operating pressure within the tire. Such foam filled tires are substantially deflation proof and almost indestructible from normal hazards, for example, bolts, nails, large holes, jagged curbs, sharp rocks, deep water, etc. Thus, foam filled tires substantially reduce the time such vehicles are down for repairs.

Examples of filled tires are shown and described in U.S. Pat. Nos. 3,022,810, 3,381,735, 3,650,865, 3,872,201, 4,060,578 and 6,623,580. U.S. Pat. No. 3,650,865 provides one example of filling a tire cavity with a curable and foamable elastomeric material to pressurize the tire. U.S. Pat. Nos. 3,650,865 and 6,623,580 describe methods of making a foam filled tire by inserting layers of a curable and foamable elastomeric material within a cured tire. The tire is then heated to cure the curable and foamable elastomeric material contained therein. The heat curing process can be performed either before, or after, the tire is mounted on a rim. Heating causes the layers of the curable and foamable elastomeric material to expand and form a closed cell foam rubber composition that provides an internal tire pressure.

Tires filled with such a curable and foamable elastomeric material have a damping similar to that of a pneumatic tire and thus, provide a pneumatic-like ride, which is especially important with unsprung off-the-road vehicles. Further, the performance of such foam filled tires is often superior to the performance of tires filled with other materials. However, when heat curing the elastomeric material in a larger off-the-road tire, substantial time is required for the inner-most portions of the elastomeric material within the tire casing to reach temperature and cure. Such a long curing time substantially increases the cost of manufacturing such tires, and thus, such tires suffer a price disadvantage in the market.

Therefore, there is a need for an improved foam filled tire structure and method of manufacture that reduces the cost of making a tire with a closed cell foam rubber composition.

SUMMARY OF THE INVENTION

The present invention provides a foam filled tire using an elastomeric material, which is substantially less expensive to make and does not compromise performance advantages of such a tire. The tire of the present invention contains a generally, centrally located core of material that does not require curing and is surrounded by a curable and foamable elastomeric material. Therefore, the time to cure the curable and foamable elastomeric material is substantially reduced, as is the cost of manufacturing such a tire. The tire of the present invention is especially useful for industrial and off-the-road vehicles.

More specifically, in one embodiment, the invention provides a tire having a core located in a cavity and a cured and foamed elastomeric material located in the cavity adjacent the core. In various aspects, the core is made of a solid material, a precured and foamed elastomeric material or a hollow rigid structure. Depending on the application, the core is a single piece or fabricated from multiple pieces.

In another embodiment, the invention provides a method of filling a cured tire by locating in a tire cavity a core and a curable and foamable elastomeric material adjacent the core. Next, the curable and foamable elastomeric material is cured to fill space adjacent the core with a closed cell foam rubber composition. In one aspect of this invention, the precured and foamed elastomeric material may be strips of elastomeric material that extend in a circumferential direction with respect to a tire centerline, discs of elastomeric material that are substantially perpendicular to the tire centerline, or radial segments or beads of precured and foamed elastomeric material that are positioned circumferentially with respect to the tire centerline. The core is located, sized and shaped within the tire cavity, so that substantially all of the curable and foamable material cures in a minimum time to provide a desired expansion and pressure after the tire is mounted on a wheel rim.

These and other objects and advantages of the present invention will become more readily apparent during the following detailed description taken in conjunction with the drawings herein.

DEFINITIONS

"Elastomeric material" means a generally elastic, heat curable material that has a rubber or synthetic rubber base, which upon curing, provides a closed cell foam rubber composition, for example, a PERMAFOAM elastomeric material commercially available from The Goodyear Tire and Rubber Company.

"Curable and foamable elastomeric material" means an uncured elastomeric material.

"Cured and foamed elastomeric material" means a closed cell foam rubber composition produced by curing an elastomeric material in a cavity of a cured tire.

"Precured and foamed elastomeric material" means a closed cell foam rubber composition produced by curing an elastomeric material outside a cured tire.

"Foam filled tire" means a tire having an interior cavity filled with at least a closed cell foam rubber composition produced by curing an elastomeric material.

DETAILED DESCRIPTION OF THE INVENTION

Figure 1:
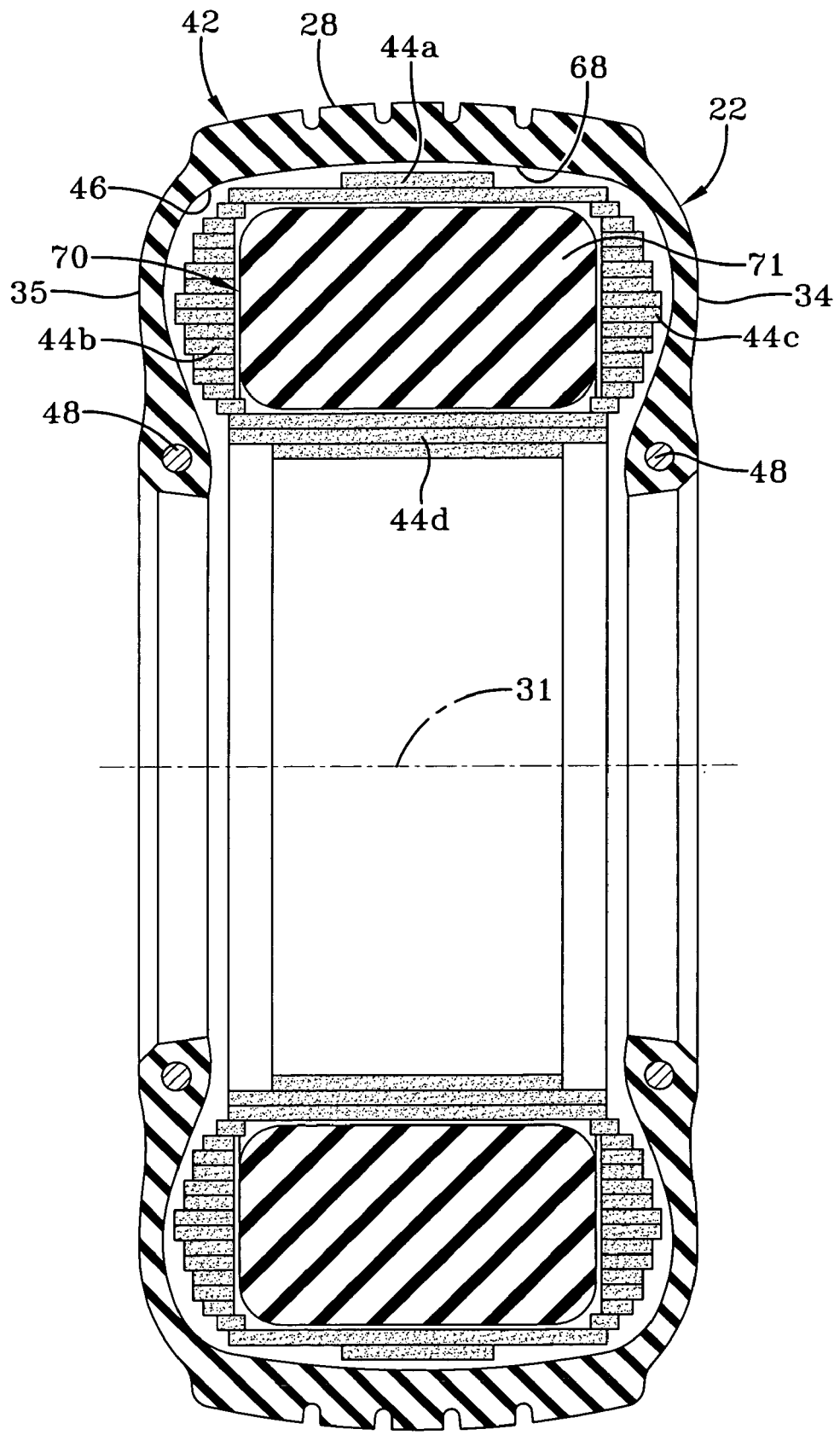
FIG. 1 is a cross-sectional view of a first embodiment of a tire that contains a core of solid material surrounded by a curable and foamable elastomeric material in accordance with the principles of the present invention.

Referring to FIG. 1, first pieces of curable and foamable elastomeric material 44a are placed in a circumferential direction inside a generally toroidal shaped open cavity 46 adjacent a casing 22 and below a tread 28 of a cured tire 42. A core 70 is then placed in the cavity 46 against the first pieces of curable and foamable elastomeric material 44a. The core 70 is generally laterally positioned in the cavity 46 between sidewalls 34, 35 by further pieces of curable and foamable elastomeric material 44b, 44c. The core 70 is further covered by pieces of curable and foamable elastomeric material 44d positioned interior of the core 70; and thus, the core 70 is radially positioned in the cavity 46 by the pieces of curable and foamable elastomeric material 44a, 44d.

The thickness of the tread 28 and adjacent casing 22 resists a transfer of heat for curing; and therefore, to help equalize the curing time for all of the elastomeric material 44a, 44b, 44c, 44d, the core 70 is not radially centered within the cavity 46 but often is located nearer the tread 28. This radially outward positioning of the core 70 in the cavity 46 reduces the amount of elastomeric material 44a that must be cured. In some applications, the core 70 may be pushed against an inner casing surface, for example, a surface 68 immediately below the tread 28.

In the example of FIG. 1, the core 70 is made of a solid material 71 that is relatively inexpensive and suitable for lengthy service in the tire 42, for example, a cured rubber, etc.

The solid material 71 can have the illustrated rectangular cross-sectional shape or any other cross-sectional shape. The solid material 71 may be molded to form a closed loop of material or extruded to any length. Further, as shown in FIG. 1, the solid material 71 may be a single piece having a relatively large cross-sectional area compared to a cross-sectional area of the cavity 46 and extend fully around a circumference of the cavity 46. The ends of the solid material 71 may be spaced apart or made contiguous and, may or may not be joined by a fastener, bonding or other process.

Figure 1A:
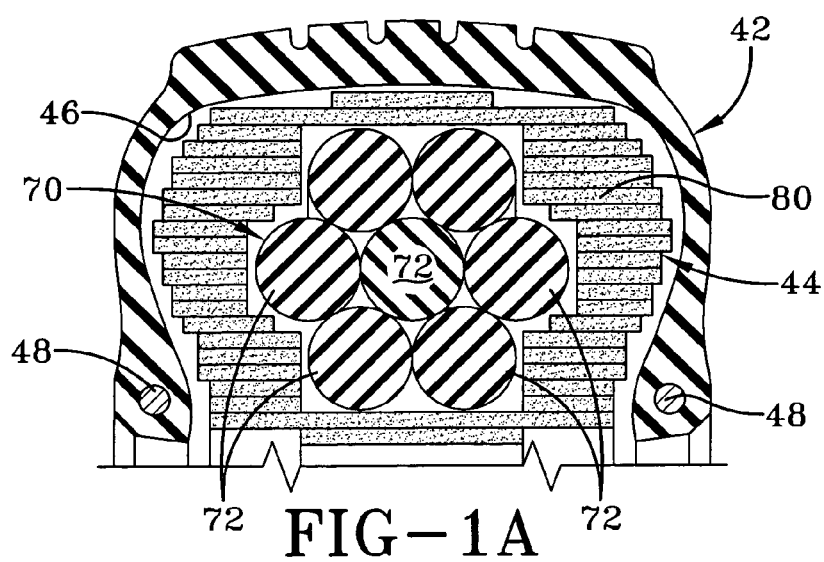
FIG. 1A is a cross-sectional view of a second embodiment of a tire that contains a core of solid material surrounded by a curable and foamable elastomeric material in accordance with the principles of the present invention.

In an alternative example shown in FIG. 1A, the core 70 may be made from one or more pieces of a solid material 72 having a smaller cross-sectional area compared to the cross-sectional area of the cavity 46. The pieces of solid material 72 may be separate lengths of solid material beads or a longer length of solid material that is spiraled over itself. In either embodiment, the pieces of solid material 72 are layered next to each other until a desired total cross-sectional area of the core 70 is achieved. In this alternative example, the layers of solid material 72 may be bonded, bound or fused together to simplify handling.

Figure 1B:
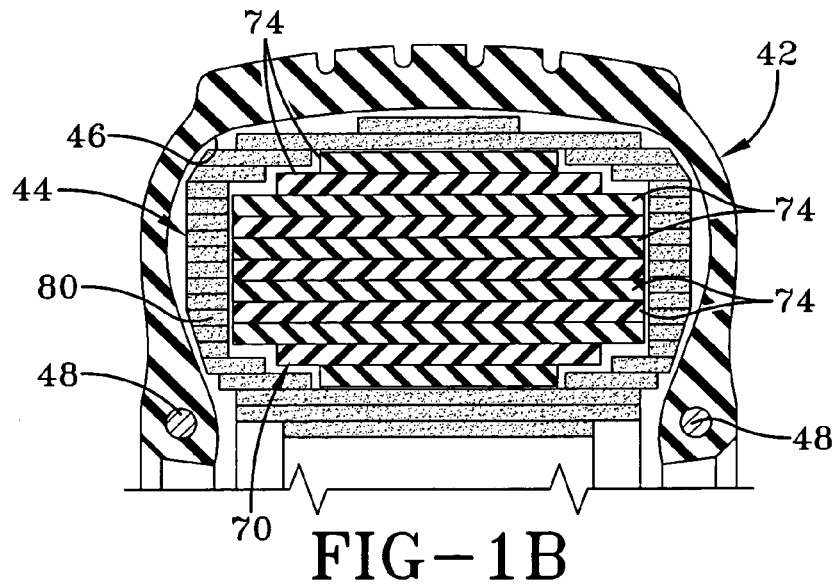
FIG. 1B is a cross-sectional view of a third embodiment of a tire that contains a core of solid material surrounded by a curable and foamable elastomeric material in accordance with the principles of the present invention.
Figure 1C:
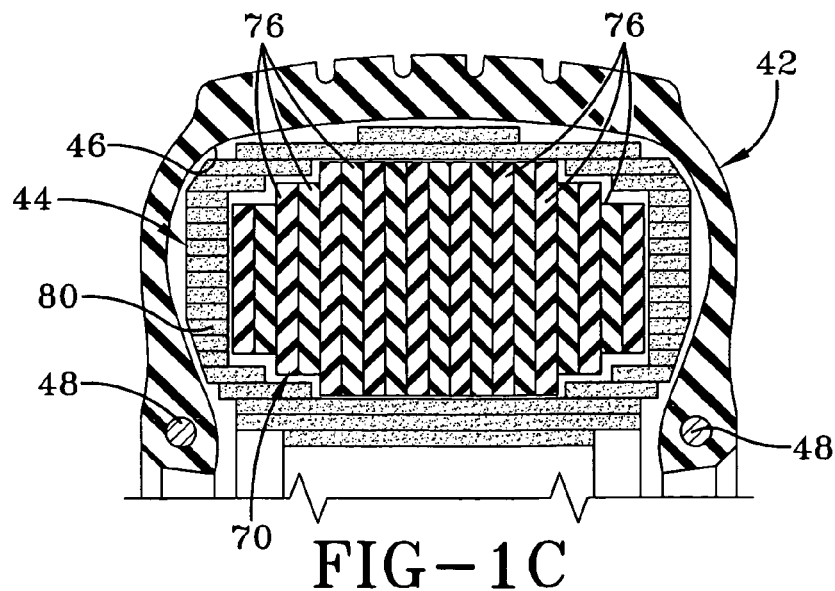
FIG. 1C is a cross-sectional view of a fourth embodiment of a tire that contains a core of solid material surrounded by a curable and foamable elastomeric material in accordance with the principles of the present invention.

In a further example shown in FIG. 1B, the core 70 may be made from solid material pieces or strips 74 that extend circumferentially around the cavity 46. Alternatively, as shown in FIG. 1C, the core 70 may be made from solid material discs 76 that also extend circumferentially around the cavity 46. Again in either embodiment, the layers of solid material 74 or 76 may be bonded, bound or fused together to simplify handling.

Although specific orientations of solid material strips 74 and solid material discs 76 are illustrated, the core 70 can be made of one or more pieces of solid material that are of any size and shape and arranged in any orientation within the cavity 46. Further, the core 70 is located, sized and shaped within the tire cavity 46 so that substantially all of the surrounding curable and foamable material 44 cures in a minimum time to provide a desired expansion and pressure after the tire 42 is mounted on a wheel rim. The core size and shape and location of the core 70 in the cavity 46 is essentially application dependent and is initially determined experimentally on a tire-by-tire basis.

As shown in FIG. 1, the curable and foamable elastomeric material 44 may be cut or formed into strips that vary in thickness and width depending on the size of the tire 42. For example, the strips may vary in thickness in a range of from about 0.5 cm (about 0.2 inch) to about 2.5 cm (about 1 inch) thick. However, strips of greater thickness, for example, about 5-61 cm (about 2-24 inches), are more practical for large earth-movertires. Typically, the thickness of the strips is relatively thin compared to the depth of the cavity 46, such that a number of layers are required to fill the cavity 46.

The successive layers of curable and foamable elastomeric material 44 may be equal or unequal in thickness and width; and if further material is needed, a separate compensator strip can be used. The number of layers of curable and foamable elastomeric material 44 is essentially application dependent and is initially determined experimentally on a tire-by-tire basis. Thus, the curable and foamable elastomeric material 44 is cut into lengths that can be readily handled and used depending on the nature of the insertion and layering process.

In a known manner, the tire 42 can be fixtured with clamps (not shown) that hook over, and spread, beads 48 to provide greater access to the tire cavity 46. Further, as is known, after several layers have been applied, they can be compressed in a radially outward direction utilizing a pneumatic inner tube (not shown) or other compression device. The quantity of curable and foamable elastomeric material 44 used is related to the density of the material 44 and a blowing agent used.

The tire 42 can be mounted on a mandrel (not shown) and placed in an oven to cure the curable and foamable elastomeric material strips 44 as shown and described in U.S. Pat. No. 6,623,580; the entirety of which is hereby incorporated by reference herein. The curable and foamable elastomeric material strips 44 can be cured in any known manner, for example, as shown and described in U.S. Pat. No. 3,872,201, entitled METHOD OF CURING FOAM INFLATED TIRES; and the entireties of which are hereby incorporated by reference herein.

Figure 2:
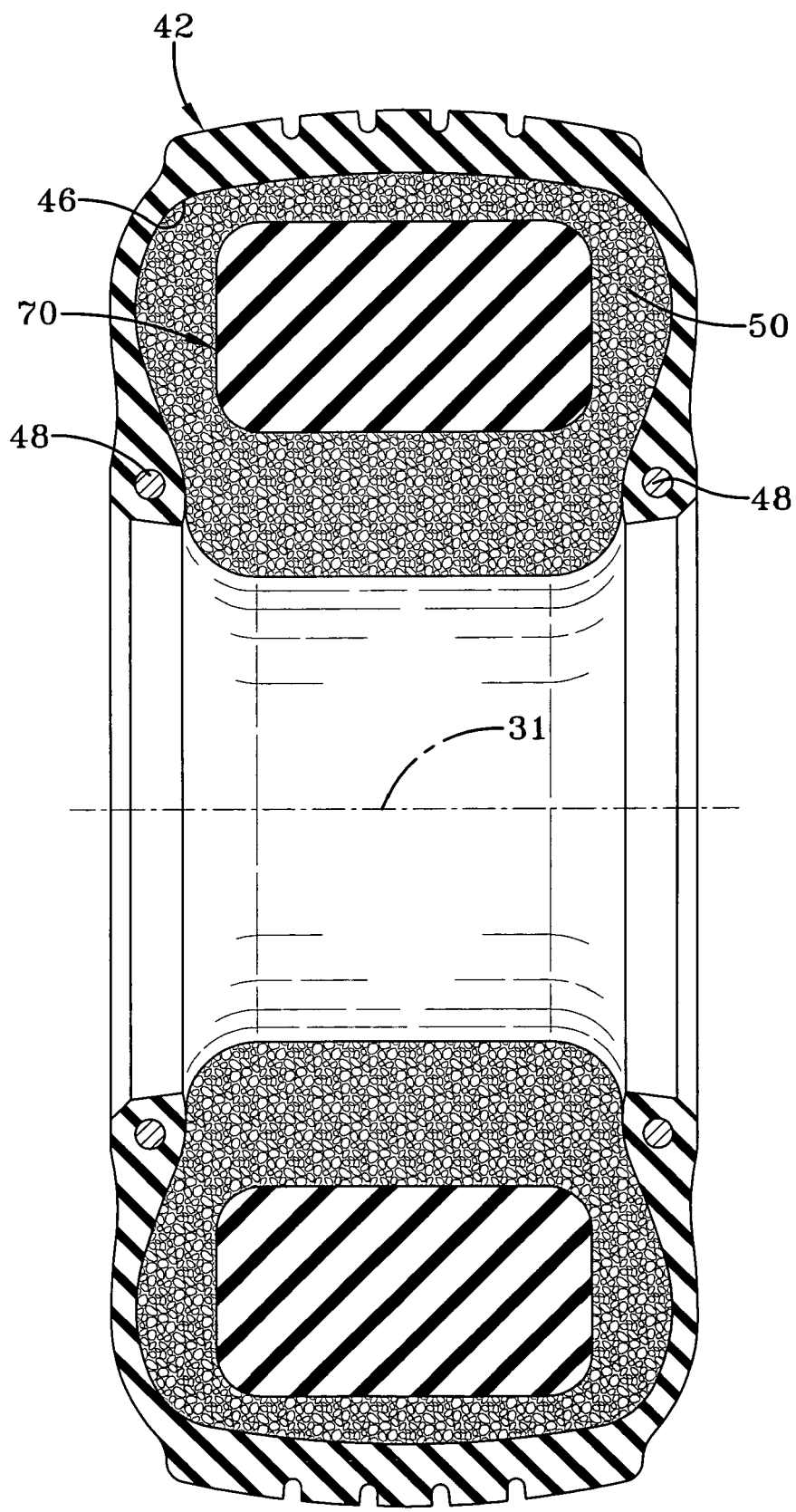
FIG. 2 is a cross-sectional view of the tire of FIG. 1 after heat curing the curable and foamable elastomeric material.

With any of the known heat curing processes, the curable and foamable elastomeric material strips 44 flow into the spaces and expand into a foamed elastomeric material. Thus, voids and spaces in the cavity 46 are filled with a cured and foamed elastomeric material, so that a volume of the tire cavity 46 surrounding the core 70 is substantially filled with a cured and foamed elastomeric material 50. As shown in FIG. 2, upon being removed from the mandrel, the cured and foamed elastomeric material 50 expands radially inward beyond the beads 48, so that upon being mounted on a rim as shown in FIG. 3A, the cured and foamed elastomeric material 50 pressurizes the tire 42 in a known manner.

Figure 3:
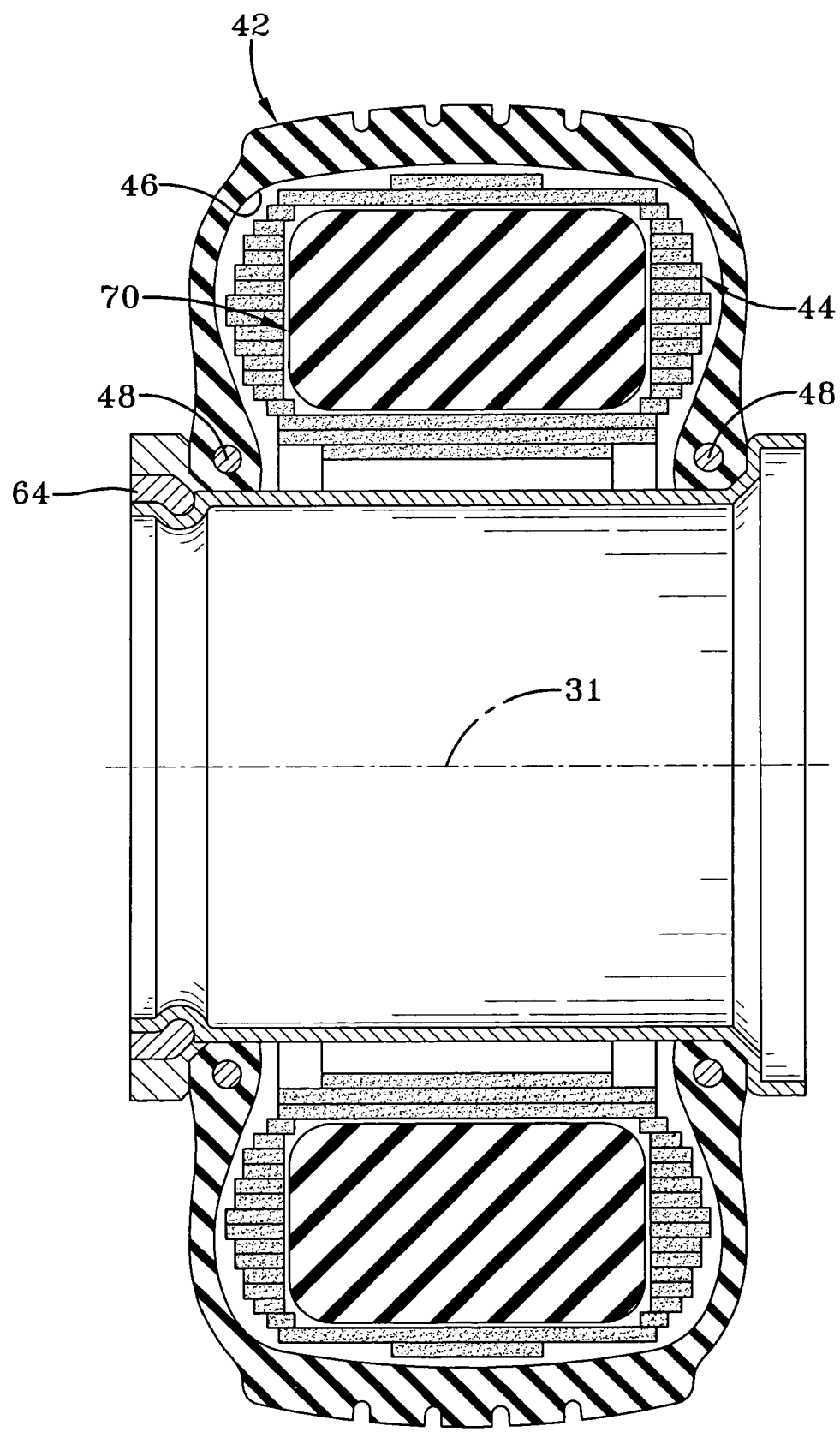
FIG. 3 is a cross-sectional view of the tire of FIG. 1 mounted on a wheel rim.
Figure 3A:
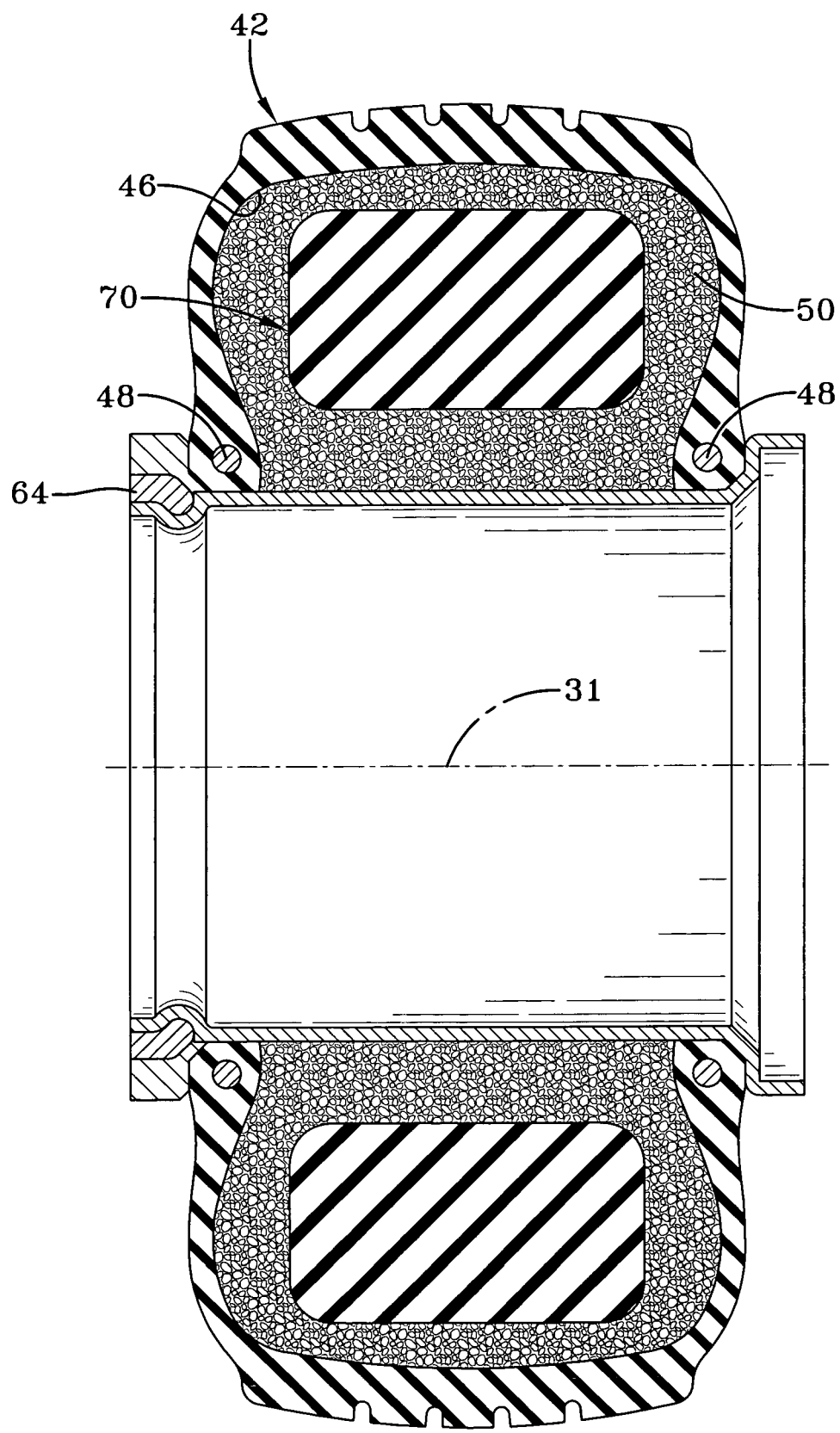
FIG. 3A is a cross-sectional view of the tire of FIG. 1 after heat curing the curable and foamable elastomeric material and mounting the tire on a wheel rim.

In a further embodiment shown in FIG. 3, the tire 42 with the curable and foamable strips 44 can be assembled onto a wheel rim 64 and placed in a curing oven to cure the curable and foamable elastomeric material strips 44 as shown and described in U.S. Pat. No. 3,650,865, the entirety of which is hereby incorporated by reference herein. Again, the curable and foamable elastomeric material strips 44 flow into the spaces and expand about the core 70 into a cured and foamed elastomeric material 50 as shown in FIG. 3A.

Figure 4:
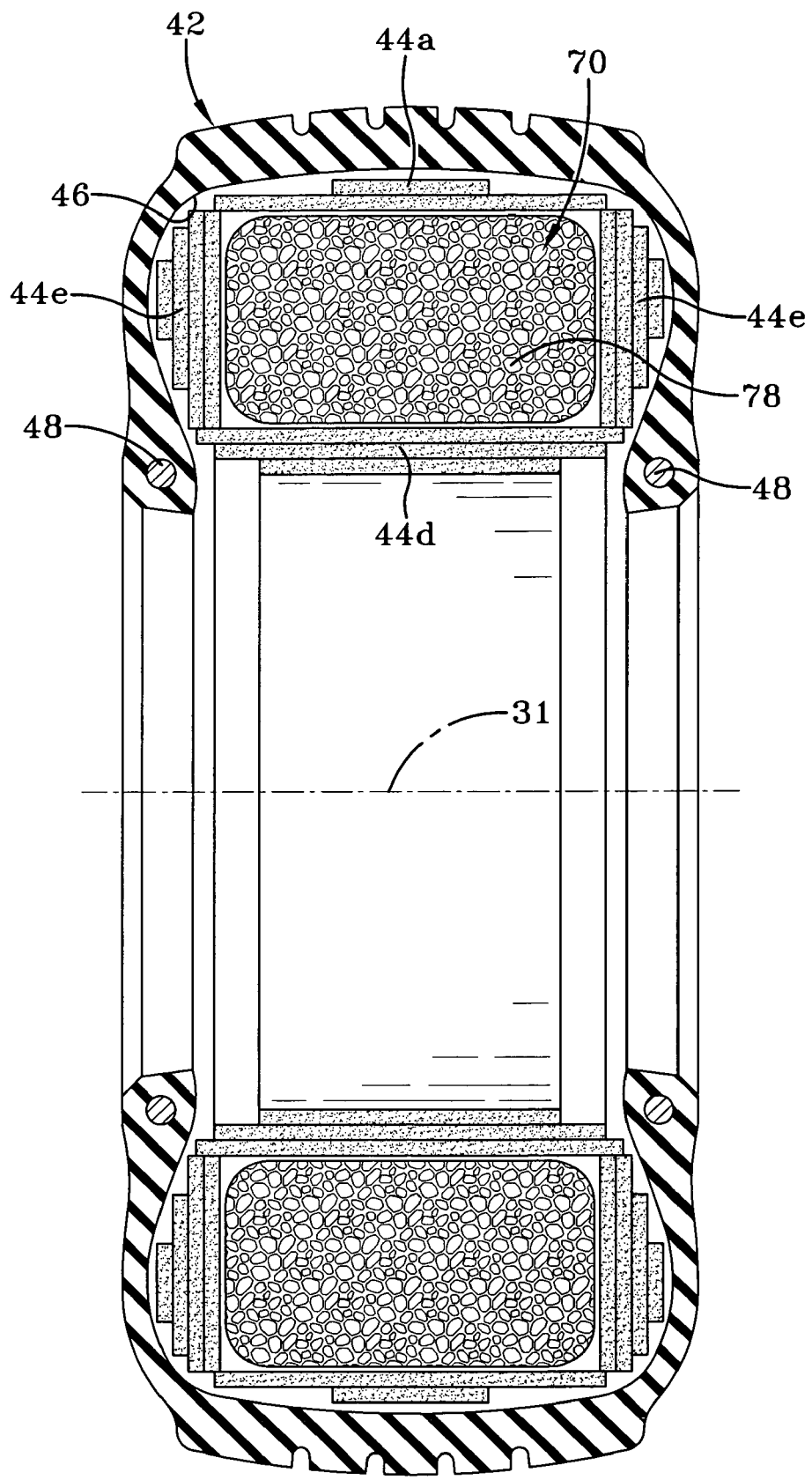
FIG. 4 is a cross-sectional view of other embodiments of a tire that contains a core of a precured and foamed elastomeric material surrounded by a curable and foamable elastomeric material in accordance with the principles of the present invention.

In another exemplary embodiment shown in FIG. 4, the core 70 is made from a precured and foamed elastomeric material 78, that is, an elastomeric material that was cured at a location outside the cured tire 42, for example, a location of a supplier of the precured and foamed elastomeric material. The precured and foamed elastomeric material 78 can have the illustrated rectangular cross-sectional shape or any other cross-sectional shape. The precured and foamed elastomeric material 78 may be molded to form a closed loop of material or extruded to any length. Further, the precured and foamed elastomeric material 78 may be a single piece having a relatively large cross-sectional area compared to a cross-sectional area of the cavity 46 and extend fully around a circumference of the cavity 46. The ends of the precured and foamed elastomeric material 78 may be spaced apart or made contiguous and, may or may not be joined by a fastener, bonding or other process.

Alternatively, in a manner similar to that shown in FIG. 1A, the precured and foamed elastomeric material 78 of FIG. 4 may be made from one or more pieces of precured and foamed elastomeric material having a smaller cross-sectional area, which are layered next to each other until a desired total cross-sectional area of the core 70 is achieved. In a further embodiment, the precured and foamed elastomeric material 78 may be made from strips or discs of precured and foamed elastomeric material that extend circumferentially around the cavity 46 in a manner similar to that shown in FIGS. 1B and 1C.

The precured and foamed elastomeric material 78 may be a new material that has been made and sold by a supplier for use as the core 70. Alternatively, the precured and foamed elastomeric material 78 may be a cured and foamed elastomeric material that has been recovered from a used tire and recycled by reforming it to the shape of the core 70. In other examples, other tires filled with a cured and foamed elastomer composition may be used, for example, tires that fail a quality inspection because of a manufacturing defect, or tires that have been returned to a manufacturer prior to the end of their useful life but cannot be resold, etc.

In the embodiment of FIGS. 1-3, the layers of curable and foamable elastomeric material 44 are positioned in a generally circumferential direction with respect to the centerline 31 of the cured tire 42. In an alternative embodiment shown in FIG. 4, discs of curable and foamable material 44e may be used adjacent the sides of the core 70. The curable and foamable material discs 44e are cut to thicknesses that permits them to be bent and manipulated, so that they can be placed inside the tire cavity 46 in a direction generally perpendicular to the tire centerline 31. Alternately, the discs of curable and foamable material 44e can be cut thicker and segmented, so that they can be readily placed inside the cavity 46.

Figure 5:
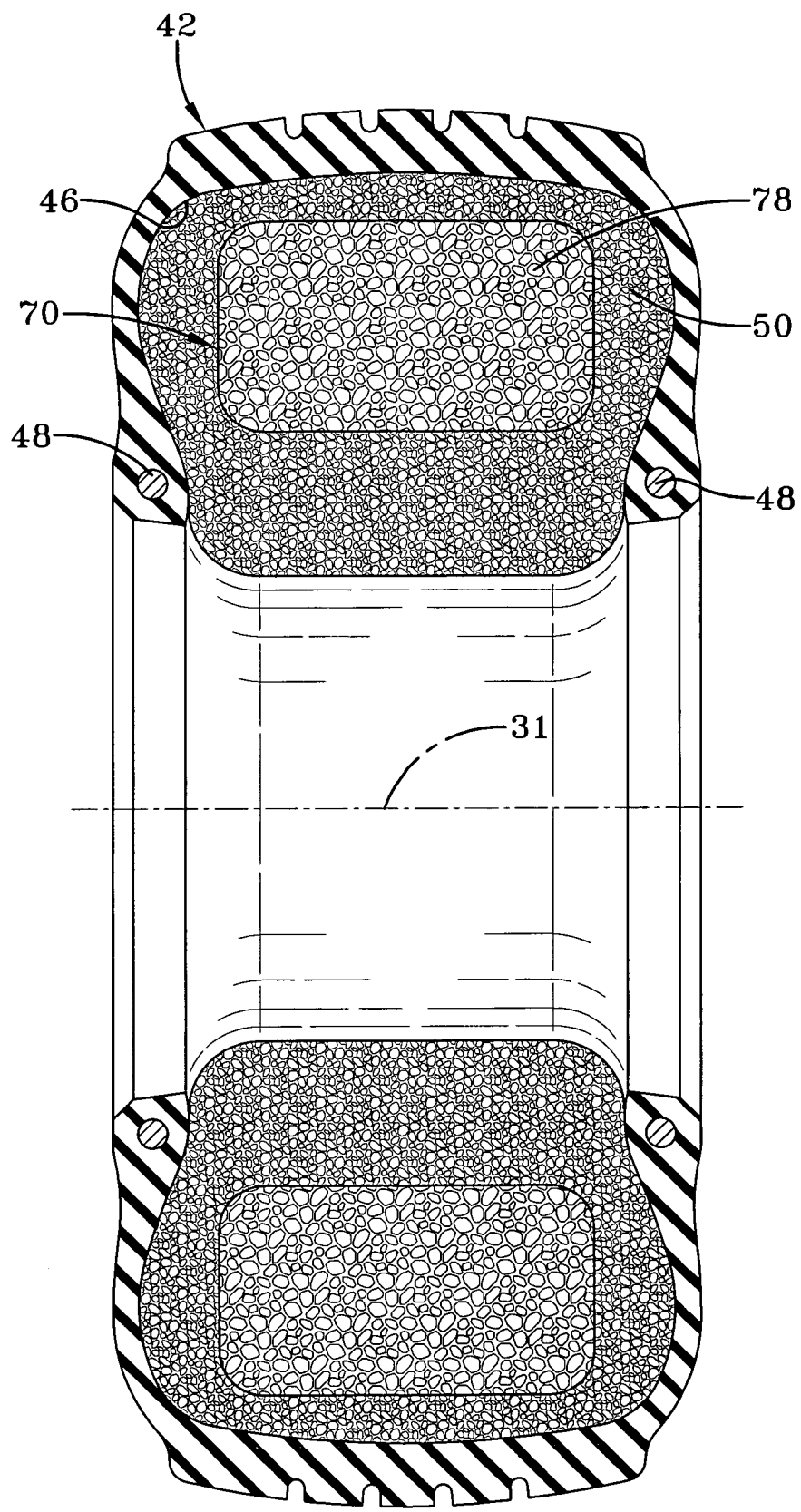
FIG. 5 is a cross-sectional view of the tire of FIG. 4 after heat curing the curable and foamable elastomeric material.

Upon heat curing the elastomeric material 44, either on a mandrel or on a rim, with any of the known heat curing processes, the elastomeric material 44 flows into the spaces and expands into a foamed elastomeric material 50 as shown in FIG. 5. Thus, voids and spaces in the cavity 46 adjacent the core 70 are filled with a cured and foamed elastomeric material 50, which along with the core 70 substantially fills the cavity 46.

Figure 6:
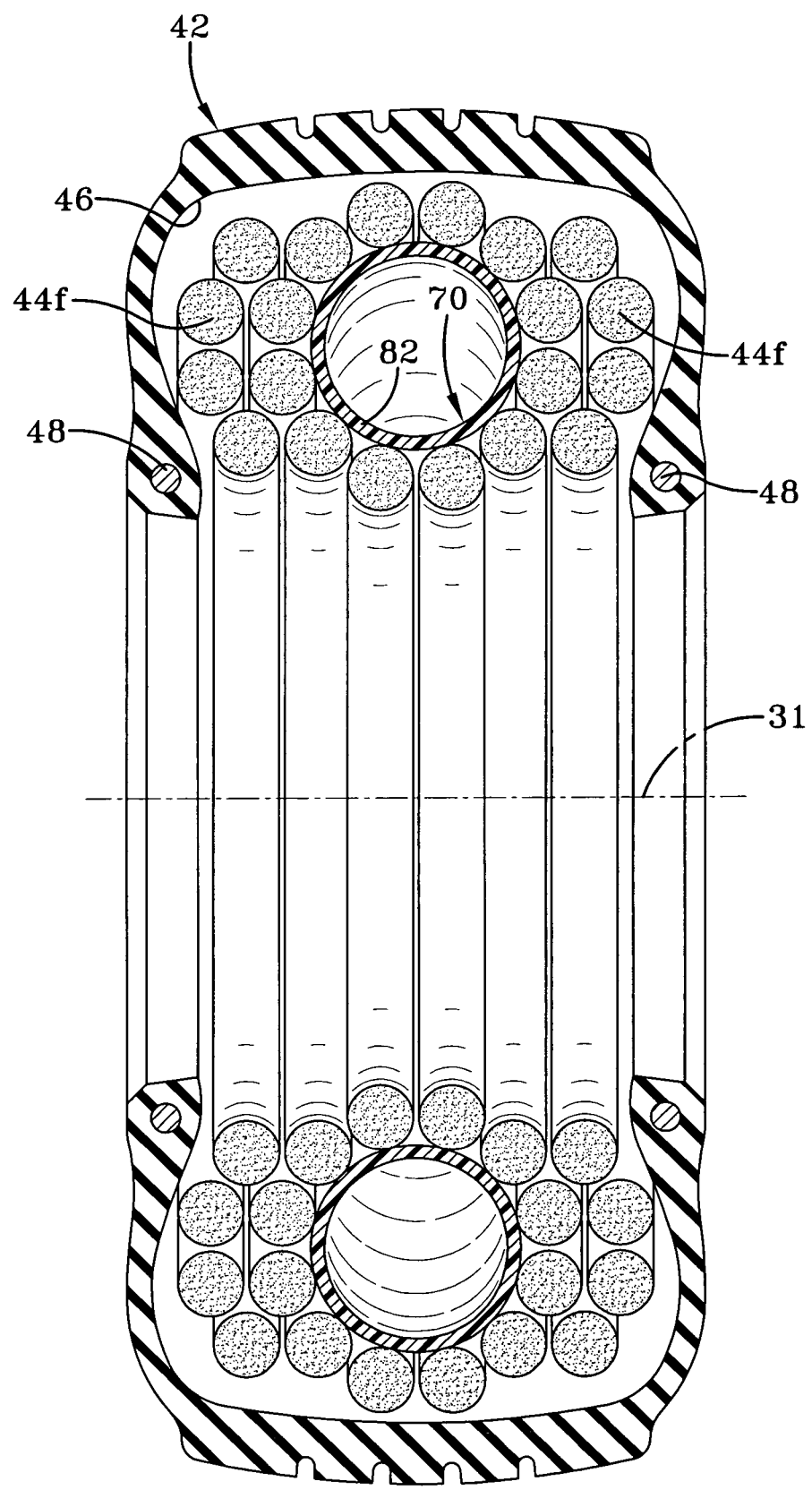
FIG. 6 is a cross-sectional view of other embodiments of a tire that contains a rigid, hollow core surrounded by a curable and foamable elastomeric material in accordance with the principles of the present invention.

In another exemplary embodiment shown in FIG. 6, the core 70 is made from a rigid hollow structure 82, for example, tubing or pipe made of steel, polyvinylchloride, etc. The rigid hollow structure 82 may have the illustrated circular cross-sectional shape or any other cross-sectional shape. The rigid hollow structure 82 may be molded to form a closed loop of material or assembled from different molded or extruded pieces to generally follow the circumferential shape of the cavity 46. Further, rigid hollow structure 82 may be a single piece having a relatively large cross-sectional area compared to a cross-sectional area of the cavity 46 and extend fully around a circumference of the cavity 46. The ends of the rigid hollow structure 82 may be spaced apart or made contiguous and, may or may not be joined by a fastener, bonding or other process.

Alternatively, in a manner similar to that shown in FIG. 1A, the rigid hollow structure 82 of FIG. 6 may be made from one or more pieces having a smaller cross-sectional area, which are layered next to each other until a desired total cross-sectional area of the core 70 is achieved. In other embodiments, the core 70 may be made from one or more rigid hollow structures that are assembled or combined together to form other shapes, for example, a honeycomb. The core 70 is sized so that substantially all of the surrounding curable and foamable material 44 cures in a minimum time to provide a desired expansion and pressure after the tire 42 is mounted on a wheel rim.

Figure 7:
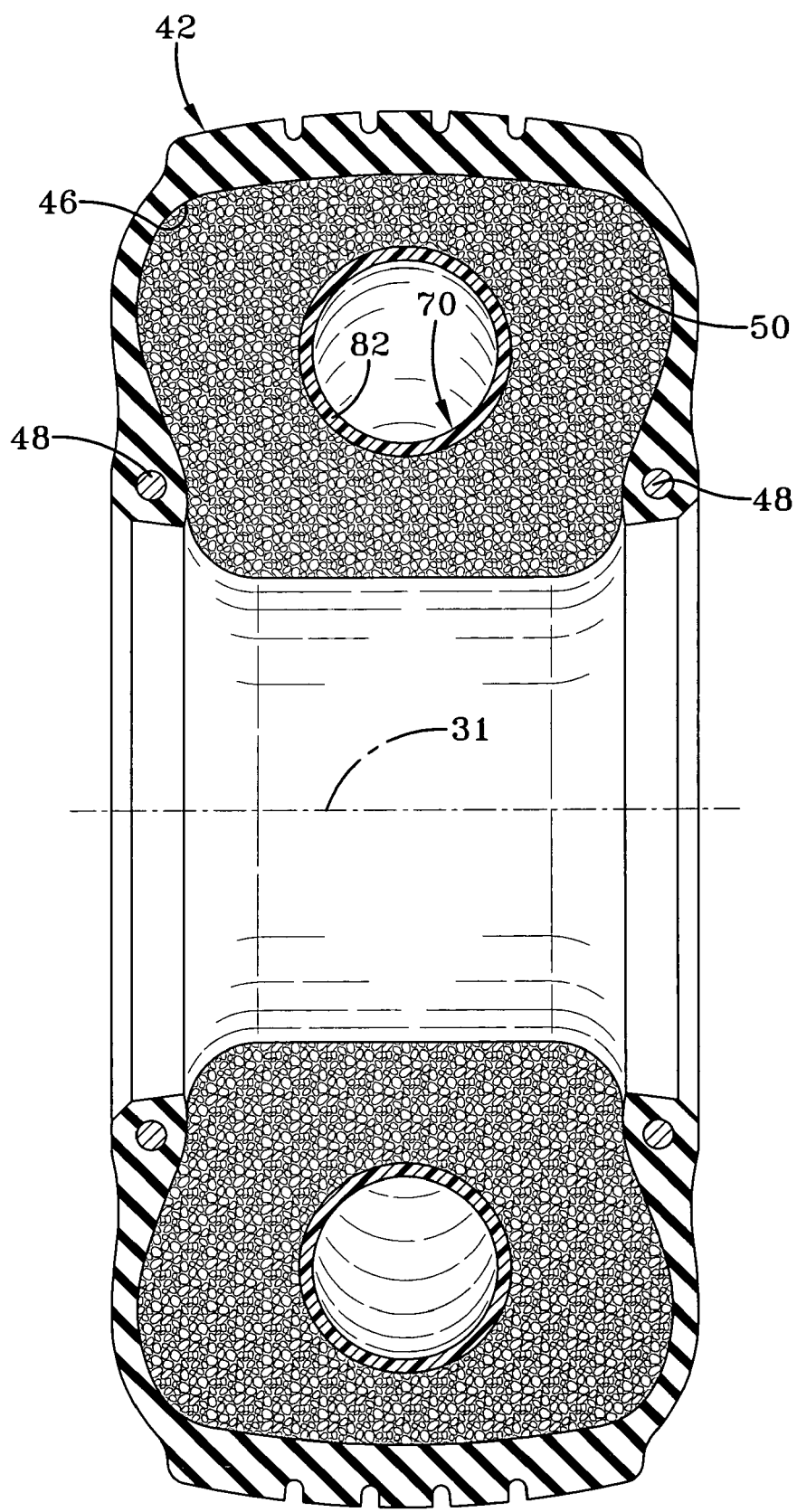
FIG. 7 is a cross-sectional view of the tire of FIG. 6 after heat curing the curable and foamable elastomeric material.

In a further alternative embodiment, as shown in FIG. 6, a bead or rope of curable and foamable elastomeric material 44f may be formed as a continuous piece or cut into pieces and used to surround the core 70 in the cured tire 42. Upon heat curing the elastomeric material 44f, either on a mandrel or on a rim, with any of the known heat curing processes, the elastomeric material 44f flows into the spaces and expands into a foamed elastomeric material 50 as shown in FIG. 7. Thus, voids and spaces in the cavity 46 adjacent the core 70 are filled with a cured and foamed elastomeric material 50, which along with the core 70 substantially fills the cavity 46.

In all of the embodiments shown and described herein, the core 70 is located, sized and shaped within the tire cavity 46 so that substantially all of the surrounding curable and foamable material 44 cures in a minimum time to provide a desired expansion and pressure after the tire 42 is mounted on a wheel rim. The core size and shape and location of the core 70 in the cavity 46 is essentially application dependent and is initially determined experimentally on a tire-by-tire basis.

By using any of the exemplary embodiments of a core 70, the quantity of curable and foamable elastomeric material required to fill the tire cavity 46 is substantially reduced, as is the time and energy required to heat cure the curable and foamable elastomeric material. Therefore, the cost of manufacturing a foam filled tire is substantially reduced without any substantive loss in tire performance. The savings are especially significant in manufacturing tires for industrial and off-the-road vehicles.

While the present invention has been illustrated by a description of various embodiments in considerable detail, there is no intention to restrict, or in any way limit, the scope of the appended claims to such detail. Additional advantages and modifications will readily appear to those skilled in the art. For example, different exemplary embodiments of the core 70 are shown and described herein with various embodiments of curable and foamable elastomeric material. However, depending on the requirements of a particular application, any exemplary embodiment of the core 70 may be used with any exemplary embodiment of the curable and foamable elastomeric material.

In the described embodiments, the various layers or pieces of curable and foamable elastomeric material are shown abutted against each other, without any spacing. It should be noted that the drawings are schematic in nature; and in practice, adjacent layers or pieces of elastomeric material may have spaces between them. Further, the various embodiments illustrate the pieces and layers of precured and foamed elastomeric material with a particular orientation with respect to the tire centerline. However, in practice, precise orientations of the pieces and layers of precured and foamed elastomeric material are not required; and the pieces and layers of precured and foamed elastomeric material may have an oblique orientation with the tire centerline.

Further, the precured and foamed elastomeric material is shown and described as strips, discs or beads. However, in other applications, the precured and foamed elastomeric material may be formed as radial segments that are positioned in the tire cavity in a circumferential direction with respect to the tire centerline.

Therefore, the invention in its broadest aspects is not limited to the specific details shown and described. Consequently, departures may be made from the details described herein without departing from the spirit and scope of the claims which follow.

What is claimed is:

1. A method of filling a cavity defined by a cured tire casing, the method comprising:
    inserting a precured and foamed elastomeric material core in the cavity of the cured casing;
    positioning a first piece of curable and foamable elastomeric material inside the cavity between the core and the casing;
    positioning a second piece of curable and foamable elastomeric material inside the cavity between the core and a tire centerline; and
    heating the filled cured tire casing for a heating time to cure the first and second pieces of curable and foamable elastomeric material to substantially encapsulate the core and fill the cavity between the core and the casing with a closed cell foam rubber composition.

2. The method of claim 1 wherein the first and second pieces of curable and foamable material are so dimensioned to reduce the heating time in comparison with a heating time to cure a tire containing only curable and foamable elastomeric material.

3. The method of claim 1 further comprising:
    placing at least one additional piece of curable and foamable elastomeric material inside the cavity between the core and a sidewall of the tire casing.

4. The method of claim 3 further comprising:
    placing at least one additional piece of curable and foamable elastomeric material inside the cavity between the core and a casing wall below a tread of the tire casing.

* * * * *